United States Patent
Nakakimura

(12) 
(10) Patent No.: US 6,621,332 B2
(45) Date of Patent: Sep. 16, 2003

(54) DEMODULATOR AND DEMODULATION METHOD OF DQPSK SYSTEM WITH REDUCED CIRCUIT SCALE

(75) Inventor: Kiyoshi Nakakimura, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 60 days.

(21) Appl. No.: 10/046,162

(22) Filed: Jan. 16, 2002

(65) Prior Publication Data
US 2002/0190807 A1 Dec. 19, 2002

(30) Foreign Application Priority Data
Apr. 26, 2001 (JP) ........................................ 2001-128913

(51) Int. Cl.[7] ................................................ H03D 3/00
(52) U.S. Cl. ........................ 329/304; 329/306; 375/324
(58) Field of Search ................................ 329/304, 306, 329/310; 375/324, 330, 331

(56) References Cited

U.S. PATENT DOCUMENTS 5,425,055 A * 6/1995 Blaker ........................ 375/329
6,028,475 A * 2/2000 Kikuchi ...................... 329/304

FOREIGN PATENT DOCUMENTS

JP 55-128954 10/1980

* cited by examiner

*Primary Examiner*—Henry Choe
(74) *Attorney, Agent, or Firm*—McDermott, Will & Emery

(57) ABSTRACT

An angular difference detector detects an angular variation according to respective signs of current xy coordinate values supplied from an FFT calculation unit and respective signs of preceding xy coordinate values. An angle calculation unit calculates an angle value of a frequency component according to respective absolute values of xy coordinate values supplied from the FFT calculation unit. Another angular difference detector classifies a difference between a current angle value and a preceding angle value supplied from a subtractor as one of a plurality of angle regions to detect an angular difference. A demapper performs demapping according to a sum of the angular variation supplied from the angular difference detector and the angular difference supplied from that another angular difference detector.

16 Claims, 7 Drawing Sheets

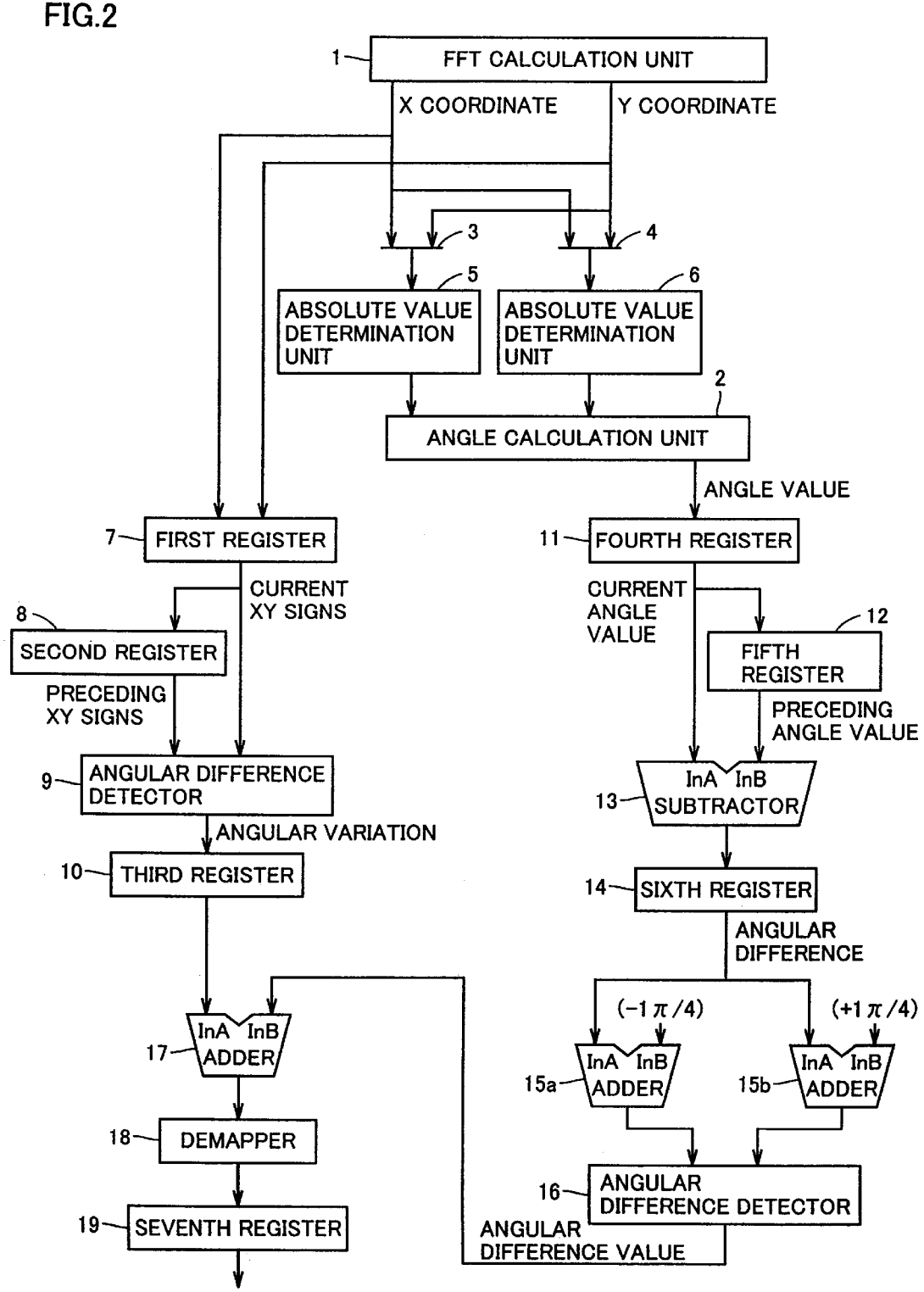

FIG.3

| PRECEDING SIGN INFORMATION | CURRENT SIGN INFORMATION | QUADRANT CHANGE | ANGULAR CHANGE DUE TO SIGN CHANGE | ANGULAR VARIATION FOR NEXT STAGE |
|---|---|---|---|---|
| FIRST QUADRANT 2' b00 | 2' b00 | 1 ⇒ 1 | 0 | 2' b00 |
| | 2' b10 | 1 ⇒ 2 | $\pi/2$ | 2' b01 |
| | 2' b11 | 1 ⇒ 3 | $\pi$ | 2' b10 |
| | 2' b01 | 1 ⇒ 4 | $3\pi/2$ | 2' b11 |
| SECOND QUADRANT 2' b10 | 2' b00 | 2 ⇒ 1 | $3\pi/2$ | 2' b11 |
| | 2' b10 | 2 ⇒ 2 | 0 | 2' b00 |
| | 2' b11 | 2 ⇒ 3 | $\pi/2$ | 2' b01 |
| | 2' b01 | 2 ⇒ 4 | $\pi$ | 2' b10 |
| THIRD QUADRANT 2' b11 | 2' b00 | 3 ⇒ 1 | $\pi$ | 2' b10 |
| | 2' b10 | 3 ⇒ 2 | $3\pi/2$ | 2' b11 |
| | 2' b11 | 3 ⇒ 3 | 0 | 2' b00 |
| | 2' b01 | 3 ⇒ 4 | $\pi/2$ | 2' b01 |
| FOURTH QUADRANT 2' b01 | 2' b00 | 4 ⇒ 1 | $\pi/2$ | 2' b01 |
| | 2' b10 | 4 ⇒ 2 | $\pi$ | 2' b10 |
| | 2' b11 | 4 ⇒ 3 | $3\pi/2$ | 2' b11 |
| | 2' b01 | 4 ⇒ 4 | 0 | 2' b00 |

FIG.4

| INPUT VALUE | ANGULAR CHANGE | DEMAP VALUE |
|---|---|---|
| 2' b00 | 0 | 2' b00 |
| 2' b01 | $\pi/2$ | 2' b01 |
| 2' b10 | $\pi$ | 2' b11 |
| 2' b11 | $3\pi/2$ | 2' b10 |

FIG.8

| COUNTER VALUE | TABLE VALUE | | NOTES |
|---|---|---|---|
| | HEXADECIMAL NOTATION (FORMAT CORRECTION) | DECIMAL NOTATION | |
| 0_0000 | 32' h1921FB54 | 0.7853981634 | π/4 VALUE |
| 0_0001 | 32' h0ED63382 | 0.4636476090 | |
| 0_0010 | 32' h07D6DD7E | 0.2449786631 | |
| 0_0011 | 32' h03FAB753 | 0.1243549945 | |
| 0_0100 | 32' h01FF55BB | 0.0624188100 | |
| 0_0101 | 32' h00FFEAAD | 0.0312398334 | |
| 0_0110 | 32' h007FFD55 | 0.0156237286 | |
| 0_0111 | 32' h003FFFAA | 0.0078123411 | |
| 0_1000 | 32' h001FFFF5 | 0.0039062301 | |
| 0_1001 | 32' h000FFFFE | 0.0019531225 | |
| 0_1010 | 32' h0007FFFF | 0.0009765622 | |
| 0_1011 | 32' h00040000 | 0.0004882812 | |
| 0_1100 | 32' h00020000 | 0.0002441406 | |
| 0_1101 | 32' h00010000 | 0.0001220703 | |
| 0_1110 | 32' h00008000 | 0.0000610352 | |
| 0_1111 | 32' h00004000 | 0.0000305176 | |
| 1_0000 | 32' h00002000 | 0.0000152588 | |
| 1_0001 | 32' h00001000 | 0.0000076294 | |
| 1_0010 | 32' h00000800 | 0.0000038147 | |
| 1_0011 | 32' h00000400 | 0.0000019073 | |
| 1_0100 | 32' h00000200 | 0.0000009537 | |
| 1_0101 | 32' h00000100 | 0.0000004768 | |
| 1_0110 | 32' h00000080 | 0.0000002384 | |
| 1_0111 | 32' h00000040 | 0.0000001192 | |
| 1_1000 | 32' h00000020 | 0.0000000596 | |
| 1_1001 | 32' h00000010 | 0.0000000298 | |
| 1_1010 | 32' h00000008 | 0.0000000149 | |
| 1_1011 | 32' h00000004 | 0.0000000075 | |
| 1_1100 | 32' h00000002 | 0.0000000017 | |
| 1_1101 | 32' h00000001 | 0.0000000019 | |

DEMODULATOR AND DEMODULATION METHOD OF DQPSK SYSTEM WITH REDUCED CIRCUIT SCALE

BACKGROUND OF THE INVENTION

1. Field of the Invention

The present invention relates to a device and a method for demodulating data by means of DQPSK (Differential Quadrature Phase Shift Keying) system.

2. Description of the Background Art

With the recent arrival of the IT (Information Technology) revolution represented by the Internet, the concept of home network is being turned into reality. As an example of the home network, a standard called ECHONET is now receiving attention.

ECHONET implements a network structured by utilizing home electric lines. Then, no investment is required in a new infrastructure, which is one of characteristics of ECHONET. Data transmission by this ECHONET is accomplished by employing a DQPSK modulation-demodulation system.

FIG. 1 is a block diagram schematically showing a structure of a conventional demodulator employing the DQPSK system. The conventional demodulator of the DQPSK system includes an FFT calculation unit 101 performing a fast Fourier transform (FFT) on a modulated waveform transmitted thereto to separate frequency components from the modulated waveform and thus outputting information about coordinates, on an xy plane, of a frequency to be processed, an angle calculation unit 102 performing a calculation on the xy coordinate information supplied from FFT calculation unit 101 to determine an angle value, a first register 103 holding a current angle value supplied from angle calculation unit 102, a second register 104 holding a preceding angle value supplied from angle calculation unit 102, a subtractor 105 subtracting the preceding angle value held in the second register 104 from the current angle value held in the first register 103, a third register 106 holding the difference between the angle values (angular difference) supplied from subtractor 105, an adder 107a adding angle "$-7\pi/4$" to the angular difference held in the third register 106, an adder 107b adding angle "$-5\pi/4$" to the angular difference held in the third register 106, an adder 107c adding angle "$-3\pi/4$" to the angular difference held in the third register 106, an adder 107d adding angle "$-1\pi/4$" to the angular difference held in the third register 106, an adder 107e adding angle "$+1\pi/4$" to the angular difference held in the third register 106, an adder 107f adding angle "$+3\pi/4$" to the angular difference held in the third register 106, an adder 107g adding angle "$+5\pi/4$" to the angular difference held in the third register 106, an adder 107h adding angle "$+7\pi/4$" to the angular difference held in the third register 106, a demapper 108 converting the angular difference into a 2-bit code according to the resultant sums supplied from adders 107a to 107h, and a fourth register 109 holding the code resultant from demapping by demapper 108.

FFT calculation unit 101 separates an analogue waveform transmitted through an electric line (not shown) into frequency components to output an x coordinate value and a y coordinate value, on the xy plane, of a frequency component as a sample to be processed.

Angle calculation unit 102 performs a calculation by means of approximate expressions on the x and y coordinate values supplied from FFT calculation unit 101 to determine a vector length and an angle value of the frequency corresponding to a current sample. The angle value has a range of "$0-2\pi$".

Synchronously with output of the angle value from angle calculation unit 102, the first register 103 holds that angle value. At the same timing as that of holding the angle value by the first register 103, the second register 104 holds an angle value supplied from the first register 103. Accordingly, when the first register 103 holds an angle value of a next sample, the second register 104 holds an angle value of a preceding sample.

Subtractor 105 subtracts the angle value of the preceding sample held in the second register 104 from the angle value of the current sample held in the first register 103 to output the difference between the angle values (angular difference). The third register 106 holds and then outputs the angular difference supplied from subtractor 105.

Angle calculation unit 102 calculates, from the x and y coordinate values, an angle value with the range of "$0-2\pi$" as described above. Accordingly, respective angle values held in the first and second registers 103 and 104 also have the range of "$0-2\pi$". The angular difference supplied from subtractor 105 thus has a range of "$-2\pi$—$2\pi$". Then, in order to demap the angular difference held in the third register 106, it is necessary to determine which of nine values, i.e., "$-2\pi$, $-3\pi/2$, $-\pi$, $-\pi/2$, 0, $\pi/2$, $\pi$, $3\pi/2$, $2\pi$" is the angular difference.

However, in the actual demodulator, the angular difference calculated by subtractor 105 has certain variation and extent because of considerable influences of noise and distortion and the fact that the calculation is performed by means of approximate expressions. Then in consideration of the variation and extent, the determination is made as detailed below.

| Determination of Angular Difference | | |
|---|---|---|
| $-2\pi$ | $\pm\pi/4$ ( ~ $-7\pi/4$) | → $-2\pi$ |
| $-3\pi/2$ | $\pm\pi/4$ ($-7\pi/4$ ~ $-5\pi/4$) | → $-3\pi/2$ |
| $-\pi$ | $\pm\pi/4$ ($-5\pi/4$ ~ $-3\pi/4$) | → $-\pi$ |
| $-\pi/2$ | $\pm\pi/4$ ($-3\pi/4$ ~ $-\pi/4$) | → $-\pi/2$ |
| 0 | $\pm\pi/4$ ($-\pi/4$ ~ $+\pi/4$) | → 0 |
| $\pi/2$ | $\pm\pi/4$ ($+\pi/4$ ~ $+3\pi/4$) | → $\pi/2$ |
| $\pi$ | $\pm\pi/4$ ($+3\pi/4$ ~ $+5\pi/4$) | → $\pi$ |
| $3\pi/2$ | $\pm\pi/4$ ($+5\pi/4$ ~ $+7\pi/4$) | → $3\pi/2$ |
| $2\pi$ | $\pm\pi/4$ ($+7\pi/4$ ~     ) | → $2\pi$ |

The determination above requires another determination as to in which region the angular difference is included. Then, a value corresponding to the boundary of each region and the angular difference undergo addition and subtraction and a sign bit of a resultant value is examined to detect a region in which the angular difference is included. Adders 107a to 107h each calculate a sum of the angular difference and the value corresponding to the boundary of each region.

For example, in order to determine whether the angular difference is greater than "$+7\pi/4$", adder 107a adds "$-7\pi/4$" to the angular difference and outputs the most significant bit of the resultant sum as a sign bit. If the angular difference is greater than "$+7\pi/4$", the resultant sum is a positive value and the sign bit supplied from adder 107a is "0". On the contrary, if the angular difference is smaller than "$+7\pi/4$", the resultant sum is a negative value and the sign bit supplied from adder 107a is "1". Similarly, adders 107b to 107h make determination regarding respective boundary values "$-5\pi/4$", "$-3\pi/4$", "$-1\pi/4$", "$+1\pi/4$", "$+3\pi/4$", "$+5\pi/4$" and "$+7\pi/4$".

Demapper 108 inputs respective signs supplied from adders 107a to 107h as 8-bit data and classifies the angular difference from the third register 106 as any of ±nπ/2 (n=0, 1, 2, 3, 4) to accomplish demapping. A relation between signs (inputs) from adders 107a to 107h and a 2-bit code after demapping is shown below. The most significant bit of an input is a sign from adder 107a and the least significant bit thereof is a sign from adder 107h.

| input | classified angular difference | demapped code |
|---|---|---|
| 8'b0000_0000 | +2π | 2'b00 |
| 8'b1000_0000 | +3π/2 | 2'b10 |
| 8'b1100_0000 | +π | 2'b11 |
| 8'b1110_0000 | +π/2 | 2'b01 |
| 8'b1111_0000 | 0 | 2'b00 |
| 8'b1111_1000 | +π/2 | 2'b10 |
| 8'b1111_1100 | −π | 2'b11 |
| 8'b1111_1110 | −3π/2 | 2'b01 |
| 8'b1111_1111 | −2π | 2'b00 |

The values above are represented according to the syntax of Verilog-HDL (hardware description language). For example, "8'b" and "2'b" means that subsequent values are represented by 8-bit binary number and 2-bit binary number respectively. "32'h" means that subsequent values are represented by 32-bit hexadecimal number.

The fourth register 109 holds the 2-bit code supplied from demapper 108 and outputs it to a circuit (not shown).

The conventional demodulator of the DQPSK system as described above has a problem that adders 107a to 107h are required for determining in which region an angular difference is included which results in increase in the circuit scale of the demodulator.

SUMMARY OF THE INVENTION

One object of the present invention is to provide a demodulator and a demodulation method by which the circuit scale can be reduced.

According to one aspect of the present invention, a demodulator includes a first calculation unit separating an analogue waveform into frequency components to calculate xy coordinate values, on an xy plane, of the frequency components, a first angular difference detector detecting an angular variation value according to respective signs of current xy coordinate values supplied from the first calculation unit and respective signs of preceding xy coordinate values, a second calculation unit calculating an angle value of a frequency component according to respective absolute values of xy coordinate values supplied from the first calculation unit, a subtractor subtracting a preceding angle value from a current angle value supplied from the second calculation unit, a second angular difference detector classifying a subtraction result supplied from the subtractor as one of a plurality of angle regions to detect an angular difference value, and a demapper performing demapping according to a sum of the angular variation value supplied from the first angular difference detector and the angular difference value supplied from the second angular difference detector.

The second calculation unit calculates the angle value of the frequency component according to respective absolute values of the xy coordinate values supplied from the first calculation unit. Circuitry for classifying a result of subtraction supplied from the subtractor as one of a plurality of angle regions can thus be reduced and accordingly the circuit scale of the demodulator can be reduced.

According to another aspect of the invention, a demodulation method includes the steps of separating an analogue waveform into frequency components to calculate preceding xy coordinate values, on an xy plane, of a frequency component, calculating current xy coordinate values on the xy plane of the frequency component, detecting an angular variation value according to respective signs of the calculated current xy coordinate values and respective signs of the preceding xy coordinate values, calculating a preceding angle value of the frequency component according to respective absolute values of the preceding xy coordinate values, calculating a current angle value of the frequency component according to respective absolute values of the current xy coordinate values, subtracting the calculated preceding angle value from the calculated current angle value, classifying a result of the subtraction as one of a plurality of angle regions to detect an angular difference value, and performing demapping according to a sum of the detected angular variation value and the detected angular difference value.

The angle value of the frequency component is calculated according to respective absolute values of the xy coordinate values. Circuitry for classifying a result of subtraction supplied from the subtractor as one of a plurality of angle regions can thus be reduced and accordingly the circuit scale of the demodulator can be reduced.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a block diagram schematically showing a structure of a demodulator according to a first embodiment of the present invention.

FIG. 3 illustrates a process of extracting an angular variation value by an angular difference detector 9.

FIG. 4 shows a relation between input values of a demapper 18 and a 2-bit code after demapping.

FIG. 8 shows parameters stored in an ATAN table 43.

DESCRIPTION OF THE PREFERRED EMBODIMENTS

First Embodiment

Figure 1:
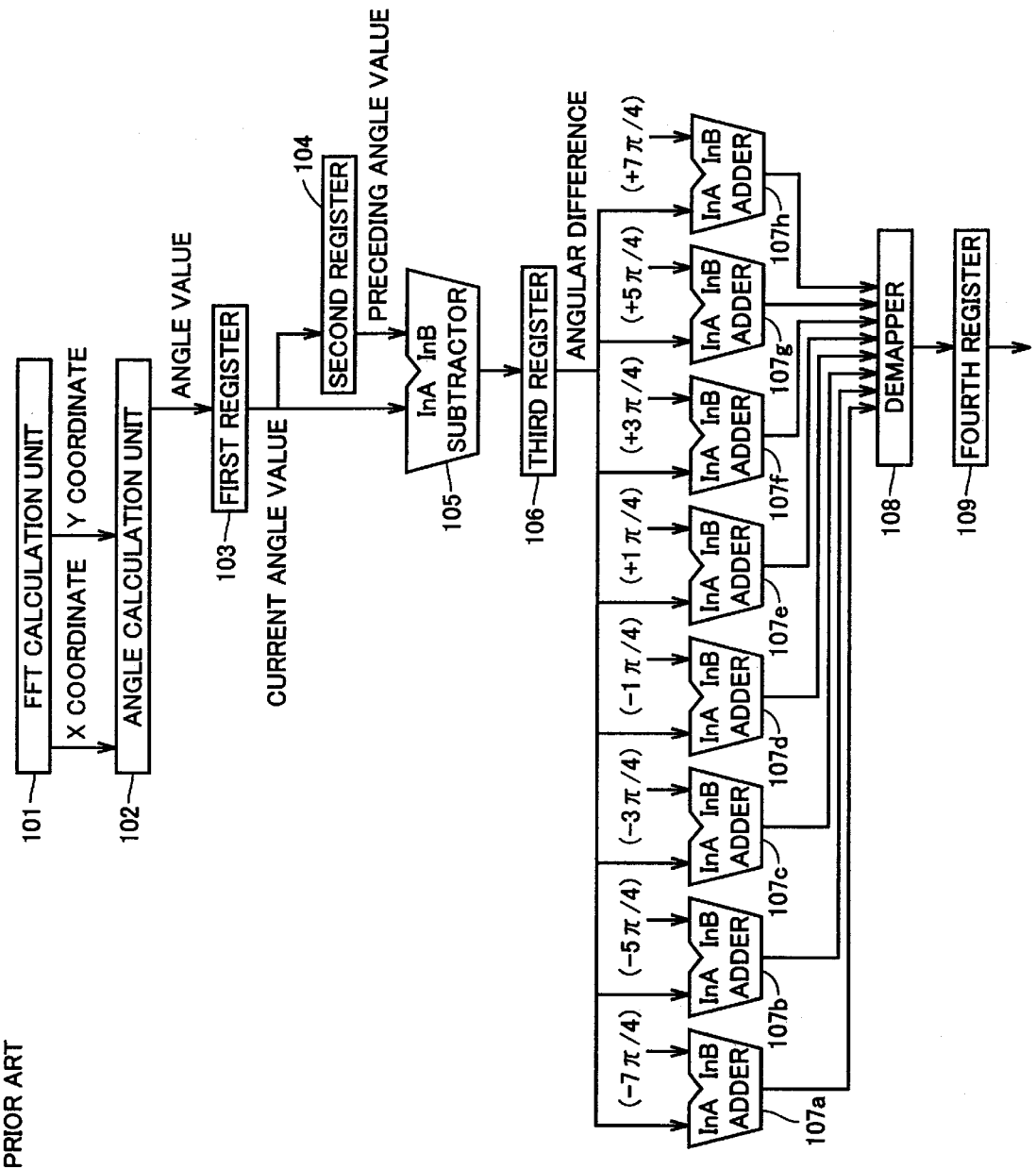
FIG. 1 is a block diagram schematically showing a structure of a conventional demodulator.

FIG. 2 is a block diagram schematically showing a structure of a demodulator of the DQPSK system according to a first embodiment of the present invention. The demodulator includes an FFT calculation unit 1 performing FFT on a modulated waveform transmitted thereto to separate frequency components from the modulated waveform and output coordinate information, on an xy plane, of a frequency to be processed, an angle calculation unit 2 performing a calculation on the xy coordinate information supplied from FFT calculation unit 1 to determine an angle value, selectors 3 and 4 selecting one of x and y coordinate values supplied from FFT calculation unit 1, an absolute value determination unit 5 calculating and outputting an absolute value of the coordinate value supplied from selector 3, an absolute value determination unit 6 calculating and outputting an absolute value of the coordinate value supplied from selector 4, a first register 7 holding current xy signs (respective most significant bits that are signs of respective x and y coordinate values) supplied from FFT calculation unit 1, a second register 8 holding preceding xy signs supplied from the first register 7, a first angular difference detector 9 calculating a difference of xy signs supplied from the first register 7 and the second register 8 to detect an angular variation, a third register 10 holding the angular variation supplied from the first angular difference detector 9, a fourth register 11 holding a current angle value supplied from angle calculation unit 2, a fifth register 12 holding a preceding angle value supplied from angle calculation unit 2, a subtractor 13 subtracting the preceding angle value held in the fifth register 12 from the current angle value held in the fourth register 11, a sixth register 14 holding the difference between the angle values supplied from subtractor 13, an adder 15a calculating a sum of the angular difference held in the sixth register 14 and angle "−1π/4", an adder 15b calculating a sum of the angular difference held in the sixth register 14 and angle "+1π/4", an angular difference detector 16 detecting which of values "−π/2", "0" and "π/2" is the angular difference according to the resultant sums from adders 15a and 15b, an adder 17 calculating a sum of the angular variation held in the third register 10 and the angular difference supplied from angular difference detector 16, a demapper 18 converting the angular difference into a 2-bit code according to the resultant sum from adder 17, and a seventh register 19 holding the code resultant from demapping by demapper 18.

FFT calculation unit 1 separates an analogue waveform transmitted through an electric line (not shown) into frequency components to output an x coordinate value and a y coordinate value, on the xy plane, of a frequency component as a sample to be processed.

Selector 3 selects and outputs one of the x and y coordinate values supplied from FFT calculation unit 1. For example, when the most significant bit as a sign bit of the x coordinate value (hereinafter x sign) and the most significant bit as a sign bit of the y coordinate value (hereinafter y sign) have the same value, namely, the coordinate values are in the first or third quadrant, selector 3 selects and outputs the x coordinate value. When the x and y signs are different values, namely, the coordinate values are in the second or fourth quadrant, selector 3 selects and outputs the y coordinate value.

Selector 4 selects and outputs one of the x and y coordinate values (x or y coordinate value not selected by selector 3) supplied from FFT calculation unit 1. For example, when x and y signs have the same value, namely, the coordinate values are in the first or third quadrant, selector 4 selects and outputs the y coordinate value. When the x and y signs are different values, namely, the coordinate values are in the second or fourth quadrant, selector 4 selects and outputs the x coordinate value.

Absolute value determination unit 5 calculates an absolute value of x or y coordinate value supplied from selector 3 and outputs the absolute value to angle calculation unit 2.

Absolute value determination unit 6 calculates an absolute value of x or y coordinate value supplied from selector 4 and outputs the absolute value to angle calculation unit 2.

Angle calculation unit 2 performs a calculation by means of approximate expressions on the absolute value of the x (y) coordinate and the absolute value of the y (x) coordinate supplied respectively from absolute value determination units 5 and 6 to determine a vector length and an angle value of a frequency corresponding to a current sample. Since the supplied xy coordinate values are always positive values, the angle value output from angle calculation unit 2 has a range of "0–π/2".

Synchronously with the output timing of the angle value from angle calculation unit 2, the fourth register 11 holds that angle value. At the same timing as that of holding the angle value by the fourth register 11, the fifth register 12 holds an angle value supplied from the fourth register 11. Accordingly, when the fourth register 11 holds an angle value of a next sample, the fifth register 12 holds an angle value of a preceding sample.

Subtractor 13 subtracts the angle value of the preceding sample held in the fifth register 12 from the angle value of the current sample held in the fourth register 11 to output the difference between the angle values. The sixth register 14 holds and then outputs the angular difference supplied from subtractor 13.

Angle calculation unit 2 calculates, from respective absolute values of x and y coordinate values, an angle value with the range of "0–π/2" as described above. Accordingly, respective angle values held in the fourth and fifth registers 11 and 12 also have the range of "0–π/2". An angular difference supplied from subtractor 13 thus has a range of "−π/2–π/2". Then, in order to demap the angular difference held in the sixth register 14, it may be determined which of three values, i.e., "−π/2, 0, π/2" is the angular difference. The determination is made as follows.

| Determination of Angular Difference | | |
|---|---|---|
| −π/2 | ±π/4 (−3π/4 ~ −π/4) | → −π/2 |
| 0 | ±π/4 (−π/4 ~ +π/4) | → 0 |
| π/2 | ±π/4 (+π/4 ~ +3π/4) | → π/2 |

The determination above requires another determination as to in which region the angular difference is included. Then, a value corresponding to the boundary of each region and the angular difference undergo addition and subtraction and the sign bit of the calculational result is examined to detect a region in which the angular difference is included. Adders 15a and 15b each calculate a sum of the angular difference and the value corresponding to the boundary of each region.

In order to determine whether the angular difference is greater than "+π/4", adder 15a adds "−π/4" to the angular difference and outputs the most significant bit, as a sign bit, of the resultant sum. If the angular difference is greater than "+π/4", the resultant sum is a positive value and the sign bit supplied from adder 15a is "0". On the contrary, if the angular difference is smaller than "+π/4", the resultant sum is a negative value and the sign bit supplied from adder 15a is "1". Similarly, adder 15b makes determination regarding the boundary "−1π/4".

Angular difference detector 16 inputs respective signs supplied from adders 15a and 15b as 2-bit data and classifies the angular difference supplied from the sixth register 14 as one of ±nπ/2 (n=0, 1). A relation between signs from adders 15a and 15b and angular differences for the next stage supplied to adder 17 is shown below. A higher order bit of an input is the sign from adder 15a and a lower order bit thereof is a sign from adder 15b.

| input | classified angular difference | angular difference for next stage |
|---|---|---|
| 2'b00 | +π/2 | 2'b01 |
| 2'b10 | 0 | 2'b00 |
| 2'b11 | −π/2 | 2'b11 |

Angle calculation unit 2 calculates an angle value from inputs, i.e., xy coordinate values supplied from FFT calculation unit 1 and then deprived of signs. Demapping thus requires that a variation in angle generated from signs separated from x and y coordinate values should be added to the angular difference for the next stage supplied from angular difference detector 16. This addition is performed by adder 17.

The variation in angle generated from signs separated from x and y coordinate values is calculated as described below. The first register 7 holds sign values of x and y coordinates as 2-bit information. The second register 8 holds sign values supplied from the first register 7 at the same timing as that of holding the sign values by the first register 7. Accordingly, when the first register 7 holds sign values of a next sample, the second register 8 holds sign values of a preceding sample.

Angular difference detector 9 inputs respective sign values supplied from the first and second registers 7 and 8 and compares the sign values to extract a variation in angle (angular variation) due to any change in signs.

FIG. 3 illustrates the process of extracting an angular variation by angular difference detector 9. For example, when the second register 8 holds preceding sign information "2'b00" and the first register 7 holds current sign information "2'b10, the quadrant changes from the first quadrant to the second quadrant. Then, angular difference detector 9 finds that an angular variation due to sign change is "π/2" and outputs "2'b01" as an angular variation to the next stage, namely adder 17.

On the contrary, when the second register 8 holds preceding sign information "2'b10" and the first register 7 holds current sign information "2'b00", the quadrant changes from the second quadrant to the first quadrant. Then, angular difference detector 9 finds that an angular variation due to sign change is "3π/2" and outputs "2'b11" as an angular variation to the next stage, adder 17.

The third register 10 holds the angular variation for the next stage and outputs it to adder 17. Adder 17 calculates a sum of the angular difference value for the next stage supplied from angular difference detector 16 and the angular variation for the next stage supplied from the third register 10 and then outputs the resultant sum. Through this process, the angular difference value calculated by subtractor 13 and the angular variation due to sign change of x and y coordinates extracted by angular difference detector 9 are added together. Adder 17 adds a 2-bit angular variation and a 2-bit angular difference together to output a 2-bit sum. There is apparently no problem in outputting a resultant sum as a 2-bit value because the angle has a 2π cycle where 0=2π.

Demapper 18 performs demapping by inputting the resultant sum supplied from adder 17 as 2-bit data. FIG. 4 illustrates a relation between input values of demapper 18 and 2-bit codes (demap value) after demapping thereof. The seventh register 19 holds a 2-bit code supplied from demapper 18 and outputs the 2-bit code to a circuit (not shown).

As heretofore described, the demodulator according to the first embodiment uses x and y coordinate values deprived of sign values to calculate an angular difference value and uses the sign values of the x and y coordinate values to calculate an angular variation. Then, a sum of the angular difference and the angular variation is calculated and accordingly demapping is performed. Consequently, a remarkable reduction is possible in the number of adders for determining in which region an angular difference is included and thus the circuit scale of the demodulator can be reduced.

Second Embodiment

Figure 5:
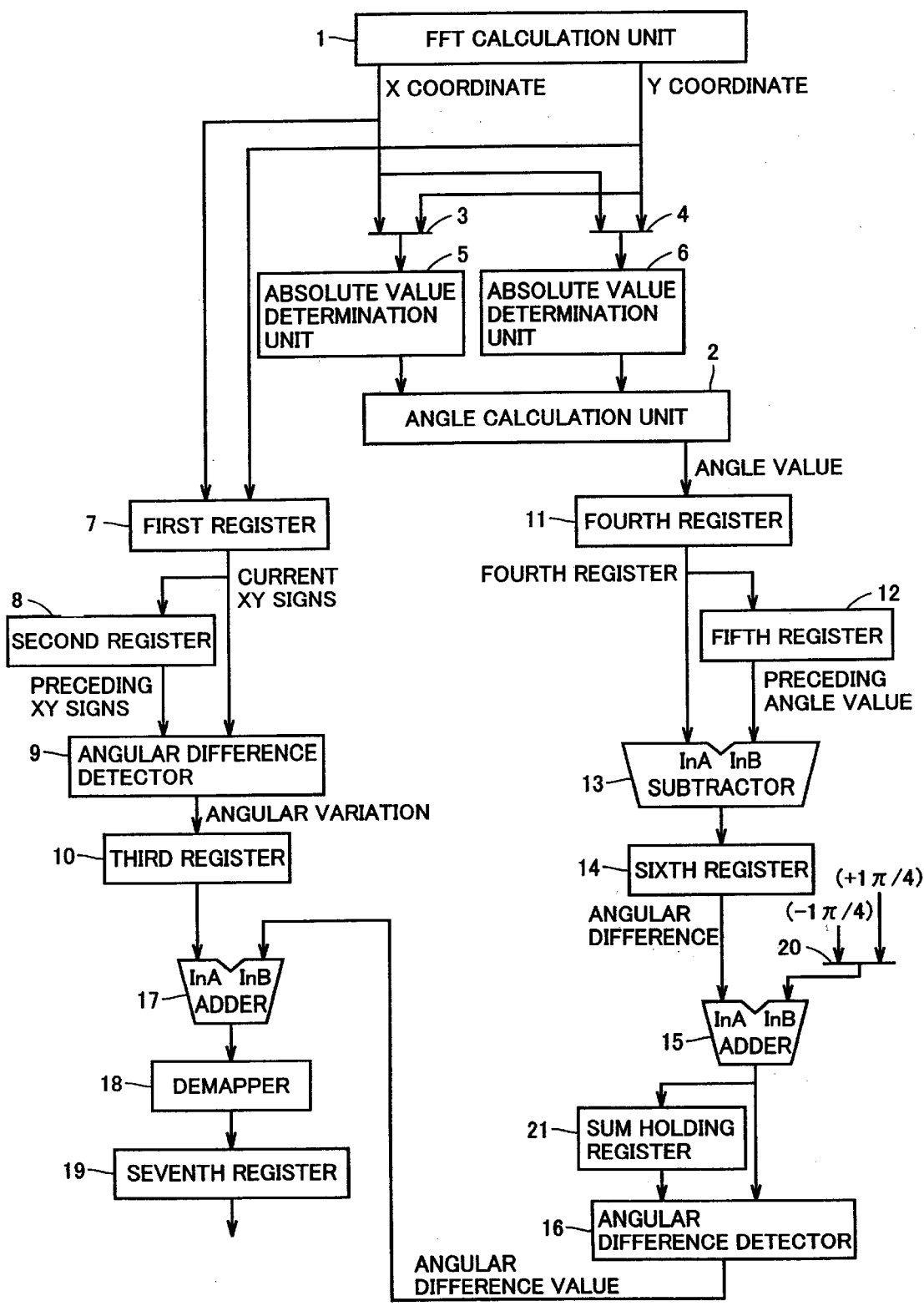
FIG. 5 is a block diagram schematically showing a structure of a demodulator according to a second embodiment of the present invention.

FIG. 5 is a block diagram schematically showing a structure of a demodulator according to a second embodiment of the present invention. The demodulator of the second embodiment differs from that of the first embodiment shown in FIG. 2 only in that adders 15a and 15b of the first embodiment are replaced with an adder 15, a selector 20 and a sum holding register 21. Therefore, detailed description of common structures and functions is not repeated here.

According to the second embodiment, additions are serially performed for determining which of "−π/2, 0 and π/2" is an angular difference supplied from a sixth register 14. Specifically, selector 20 first selects and outputs "−1π/4" to adder 15. Adder 15 calculates a sum of the angular difference supplied from the sixth register 14 and "−1π/4" and outputs the sum to sum holding register 21. Sum holding register 21 holds that sum.

Next, selector 20 selects and outputs "+1π/4" to adder 15. Adder 15 calculates a sum of the angular difference supplied from the sixth register 14 and "+1π/4" and supplies the sum to angular difference detector 16.

Angular difference detector 16 inputs the sum held in sum holding register 21 and the sum supplied from adder 15 and classifies the angular difference supplied from the sixth register 14 as one of ±nπ/2 (n=0,1). The subsequent procedure is the same as that described with regard to the first embodiment.

As discussed above, the demodulator according to the second embodiment performs additions serially by adder 15. Namely, an addition of an angular difference supplied from the sixth register 14 and "−1π/4" and an addition of the angular difference supplied from the sixth register 14 and "+1π/4" are performed in series. In this way, the number of adders can further be reduced compared with that of the demodulator of the first embodiment. Then, the demodulator can be implemented with a further reduced circuit scale.

Third Embodiment

Figure 6:
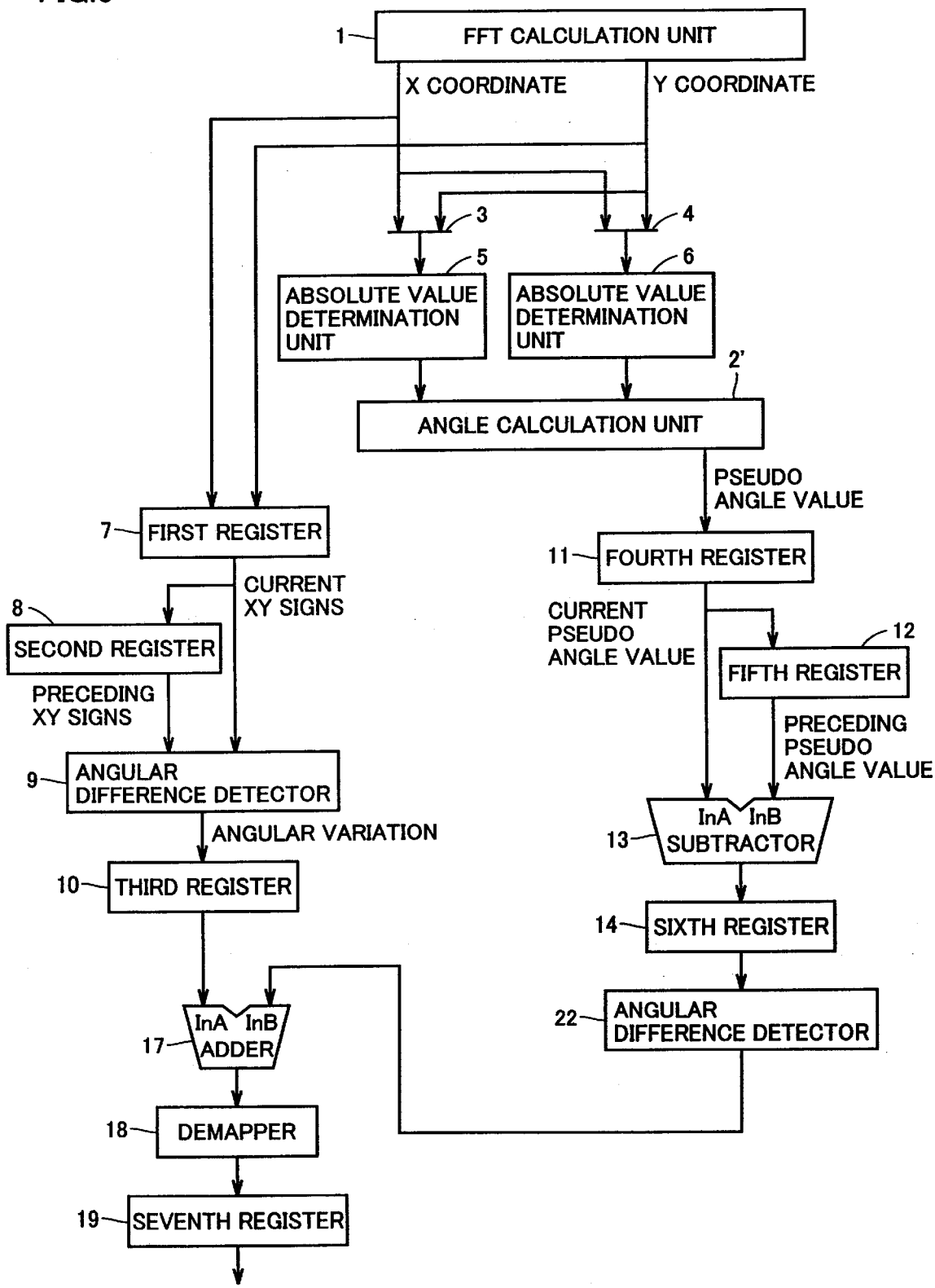
FIG. 6 is a block diagram schematically showing a structure of a demodulator according to a third embodiment of the present invention.

FIG. 6 is a block diagram schematically showing a structure of a demodulator according to a third embodiment of the present invention. The demodulator of the third embodiment differs from that of the first embodiment shown in FIG. 2 only in the functions of the angle calculation units and in that adders 15a and 15b and angular difference detector 16 of the first embodiment are replaced with an angular difference detector 22. Therefore, detailed description of common structures and functions is not repeated and the angular calculation unit of the third embodiment is denoted by 2' for description thereof.

Synchronously with an output timing of a pseudo angle value described below from angle calculation unit 2', a fourth register 11 holds that pseudo angle value. A fifth register 12 holds a pseudo angle value supplied from the fourth register 11 at the same timing as that of holding the pseudo angle value by the fourth register 11. Accordingly, when the fourth register 11 holds a pseudo angle value of a next sample, the fifth register 12 holds a pseudo angle value of a preceding sample.

A subtractor 13 subtracts the pseudo angle value of the preceding sample held in the fifth register 12 from the pseudo angle value of the current sample held in the fourth register 11 and then outputs the difference between these pseudo angle values. A sixth register 14 holds and outputs the difference between the pseudo angle values supplied from subtractor 13. The pseudo angle values with the angle values "0-π/2" are represented by hexadecimal values "32'h00000000–32'h40000000" as detailed below. Accordingly, a difference between pseudo angle values supplied from subtractor 13 is a hexadecimal number of "32'hc0000000–32'h40000000" corresponding to "−π/2–+π/2".

For demapping of the angular difference held in the sixth register 14, angular difference detector 22 determines which of three values, i.e., "−π/2, 0 and π/2" is the difference between pseudo angle values. The determination is made similarly to that of the first embodiment as shown below.

| Determination of Angular Difference | | |
|---|---|---|
| −π/2 | ±π/4 (−3π/4 ~ −π/4) | → −π/2 |
| 0 | ±π/4 (−π/4 ~ +π/4) | → 0 |
| π/2 | ±π/4 (+π/4 ~ +3π/4) | → π/2 |

±nπ/4 (n=1,3) as a boundary value is represented by a difference in pseudo angle values. Then, classification can be made as follows.

| value in sixth register 14 | angular difference | output of angular difference detector 22 |
|---|---|---|
| 32'hA000000 − 32'hE0000000 | +π/2 | 2'b01 |
| 32'hE000000 − 32'h20000000 | 0 | 2'b00 |
| 32'h2000000 − 32'h60000000 | −π/2 | 2'b11 |

Specifically, when the sixth register 14 holds a difference in pseudo angle values with higher three bits "101" or "110", angular difference detector 22 outputs "2'b01". When the sixth register 14 holds a difference in pseudo angle values with higher three bits "111" or "000", angular difference detector 22 outputs "2'b00". When the sixth register 14 holds a difference in pseudo angle values with higher three bits "001" or "010", angular difference detector 22 outputs "2'b11".

In this way, angular difference detector 22 can calculate an angular difference merely by examining higher three bits of the difference in pseudo angle values held in the sixth register 14.

Figure 7:
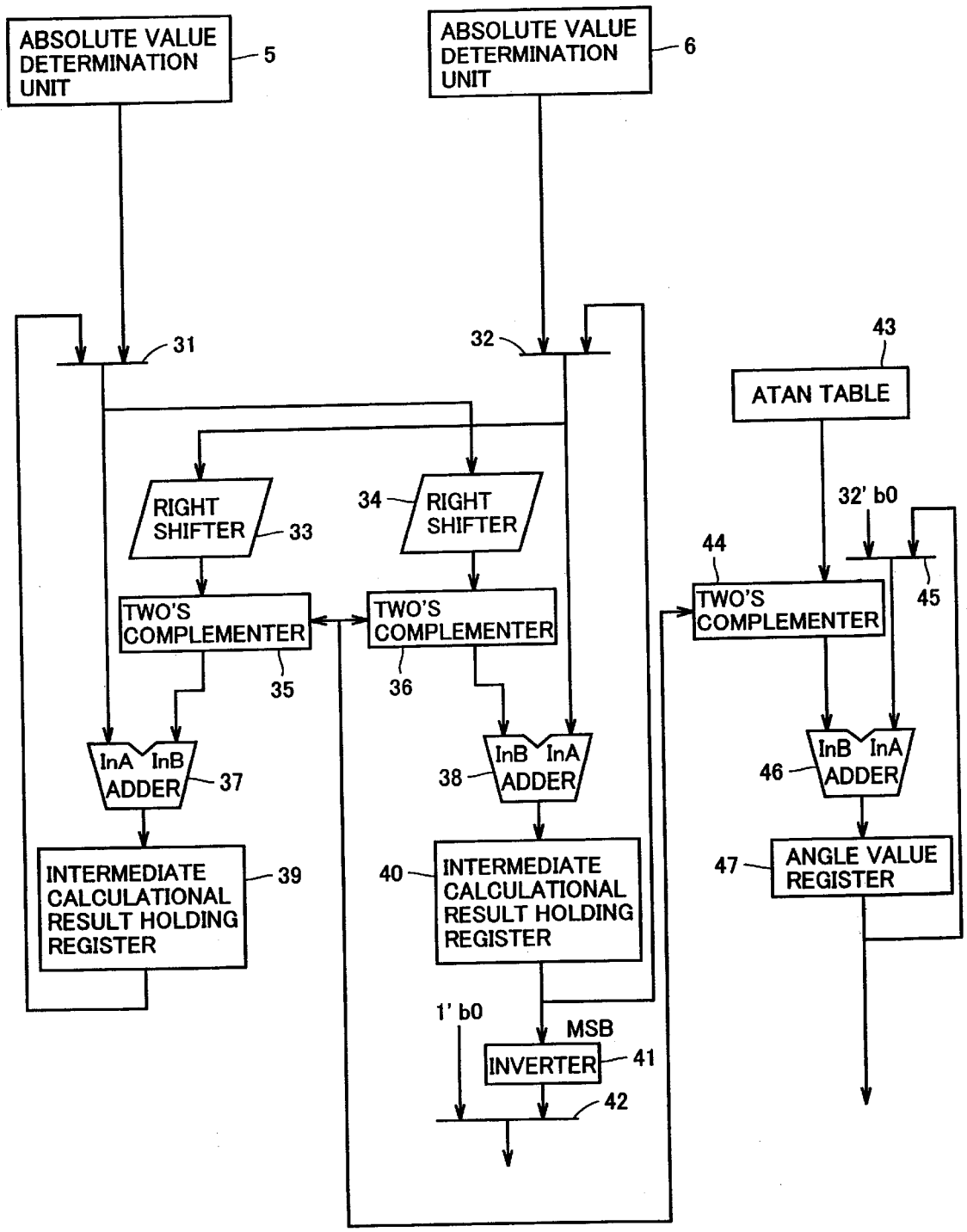
FIG. 7 is a block diagram schematically showing a structure of an angle calculation unit 2' according to the third embodiment of the invention.

FIG. 7 is a block diagram schematically showing a structure of angle calculation unit 2' according to the third embodiment of the present invention. Angle calculation unit 2' includes a selector 31 selecting and outputting one of an absolute value of an x (y) coordinate value supplied from an absolute value determination unit 5 and a first intermediate calculational result (described later), a selector 32 selecting and outputting one of an absolute value of a y (x) coordinate value supplied from an absolute value determination unit 6 and a second intermediate calculational result (described later), a first shifter 33 right-shifting the value supplied from selector 32, a second shifter 34 right-shifting the value supplied from selector 31, a first two's complementer 35 calculating two's complement from the value supplied from the first shifter 33, a second two's complementer 36 calculating two's complement from the value supplied from the second shifter 34, an adder 37 calculating a sum of the value supplied from selector 31 and the value supplied from the first two's complementer 35, an adder 38 calculating a sum of the value supplied from selector 32 and the value supplied from the second two's complementer 36, an intermediate calculational result holding register 39 holding the first intermediate calculational result supplied from adder 37, an intermediate calculational result holding register 40 holding the second intermediate calculational result supplied from adder 38, an inverter 41 inverting the most significant bit of the second intermediate calculational result from intermediate calculational result holding register 40, a selector 42 selecting and outputting one of the value from inverter 41 and "1'b0", an ATAN table 43 storing parameters used for calculating an angle value, a third two's complementer 44 calculating two's complement of a parameter supplied from ATAN table 43, a selector 45 selecting and outputting one of an intermediate calculational result of an angle value and "32'b0", an adder 46 calculating a sum of the value from the third two's complementer 44 and the value from selector 45, and an angle value register 47 holding the sum supplied from adder 46. Referring to FIG. 7, components included in approximately two-thirds on the left of angle calculation unit 2' calculate a vector length while components included in approximately one-third thereof on the right calculate an angle value.

Angle calculation unit 2' is controlled by values counted by a counter (not shown). The following description concerns calculation of a signed 32-bit angle value by angle calculation unit 2'. In this case, the counter (not shown) counts 30 cycles from "0" to "29" and angle calculation unit 2' executes the 30-cycle process to calculate an angle value.

When the counter indicate value "0", selectors 31 and 32 select and output respective absolute values from absolute value determination units 5 and 6 respectively. When the counter indicates any value except for "0", selectors 31 and 32 select and output respective intermediate calculational results held in intermediate calculational result holding registers 39 and 40 respectively.

The value from selector 31 is supplied to adder 37 and the second shifter 34. The second shifter 34 is controlled by a control counter (not shown) to shift the supplied value in the right direction by a value set by the control counter. Similarly, the value from selector 32 is supplied to adder 38 and the first shifter 33. The first shifter 33 is controlled by a control counter (not shown) to shift the supplied value in the right direction by a value set by the control counter.

The first and second two's complementers 35 and 36 are controlled by a value supplied from selector 42. When selector 42 supplies value "0", the first and second two's complementers 35 and 36 respectively output respective values from the first and second shifters 33 and 34 directly to adders 37 and 38 respectively. When selector 42 supplies value "1", the first and second two's complementers 35 and 36 respectively calculate two's complements of respective values from the first and second shifters 33 and 34 and output the resultant complements to adders 37 and 38 respectively.

When the counter indicates value "0", selector 42 selects and outputs "1'b0" and the first and second two's complementers 35 and 36 directly output respective values from the first and second shifters 33 and 34 to adders 37 and 38. When the counter indicates any value except for "0", selector 42 selects and outputs the output from inverter 41 and the first and second two's complementers 35 and 36 directly output respective values from the first and second shifters 33 and 34 or calculate two's complements and accordingly perform respective operations according to the value from selector 42.

Adder 37 calculates a sum of respective values from selector 31 and the first two's complementer 35 and outputs the resultant sum. Intermediate calculational result holding register 39 holds the sum supplied from adder 37 and outputs the sum to selector 31. Similarly, adder 38 calculates a sum of respective values from selector 32 and the second two's complementer 36 and outputs the resultant sum. Intermediate calculational result holding register 40 holds the sum from adder 38 and outputs the sum to selector 32 and inverter 41.

Inverter 41 inverts and then outputs the most significant bit, namely the value of the sign bit, of the second intermediate calculational result held in intermediate calculational result holding register 40. When counter indicates any value except for "0", the first and second two's complementers 35 and 36 perform respective operations according to the sign bit of the second intermediate calculational result held in intermediate calculational result holding register 40.

The process as discussed above is repeated thirty times from the value "0" to the value "29" of the counter to calculate a vector length.

An angle value is calculated as described below. According to a value of the counter, a parameter is read from ATAN table 43 that is supplied to the third two's complementer 44. When selector 42 outputs value "0", the third two's complementer 44 directly outputs the parameter from ATAN table 43 to adder 46. When selector 42 outputs any value except for "0", the third two's complementer 44 calculates two's complement of the parameter supplied from ATAN table 43 and outputs the calculated complement to adder 46.

When the counter indicates value "0", selector 45 selects and outputs an immediate data "32'b0" to adder 46. When the counter indicates any value except for "0", selector 45 selects an intermediate calculational result of the angle value supplied from angle value register 47 and outputs the selected value to adder 46.

Adder 46 calculates a sum of the value from the third two's complementer 44 and the value from selector 45 and outputs the sum to angle value register 47. Angle value register 47 holds the sum supplied from adder 46 and outputs the sum to selector 45. The process as described above is repeated thirty times from the value "0 to the value "29" of the counter and thus the value held in angle value register 47 is output as an angle value.

FIG. 8 shows parameters stored in ATAN table 43. These parameters are used by respective demodulators according to the first and second embodiments. Referring to FIG. 8, when the counter indicates value "0_0000", parameter "32'h1921FB54" is read out. As described above, the angle calculation unit 2 of the first and second embodiments outputs a value of "0–π/2". π/2 is represented by hexadecimal number "32'h3243F6A8" which is inappropriate for digital circuit processing.

According to the third embodiment, π/2 is represented by hexadecimal number "32'h40000000" and then respective parameters shown in FIG. 8 are corrected according to the hexadecimal number and then stored in ATAN table 43. For example, when the counter indicates value "0_0000", parameter "32'h20000000" is stored. Angle calculation unit 2' uses this corrected parameter to calculate an angle value. Accordingly, angular difference detector 22 can use higher three bits of the difference in pseudo angle values held in the sixth register to determine an angular difference value to be supplied to adder 17.

As heretofore described, in the demodulator according to the third embodiment, angle calculation unit 2' refers to ATAN table 43 storing corrected parameters when calculation unit 2' calculates an angle value.

Then, it is possible for angular difference detector 22 to use higher three bits only of the difference in pseudo angle values stored in the sixth register 14 to detect an angular difference value. Consequently, the demodulator of the third embodiment does not require adders 15a and 15b of the first embodiment and adder 15 of the second embodiment, achieving a further reduction of the circuit scale of the demodulator.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A demodulator comprising:
   a first calculation unit separating an analogue waveform into a frequency component to calculate xy coordinate values, on an xy plane, of the frequency component;
   a first angular difference detector detecting an angular variation value according to respective signs of current xy coordinate values supplied from said first calculation unit and respective signs of preceding xy coordinate values;
   a second calculation unit calculating an angle value of said frequency component according to respective absolute values of xy coordinate values supplied from said first calculation unit;
   a subtractor subtracting a preceding angle value from a current angle value supplied from said second calculation unit;
   a second angular difference detector classifying a subtraction result supplied from said subtractor as one of a plurality of angle regions to detect an angular difference value; and
   a demapper performing demapping according to a sum of the angular variation value supplied from said first angular difference detector and the angular difference value supplied from said second angular difference detector.

2. The demodulator according to claim 1, further comprising:
   a first selector outputting, when respective signs of xy coordinate values supplied from said first calculation unit are the same, said xy coordinate values directly, and interchanging, when respective signs of xy coordinate values are different from each other, said xy coordinate values and accordingly outputting the xy coordinate values; and
   an absolute value determination unit calculating respective absolute values of the values supplied from said first selector and supplying the calculated absolute values to said second calculation unit.

3. The demodulator according to claim 1, further comprising:

a first adder calculating a sum of the subtraction result supplied from said subtractor and a first value and supplying a sign of the sum to said second angular difference detector; and a second adder calculating a sum of the subtraction result supplied from said subtractor and a second value different from said first value and supplying a sign of the sum to said second angular difference detector.

4. The demodulator according to claim 1, further comprising:

a second selector selecting and outputting one of a first value and a second value different from the first value;

an adder calculating a sum of the subtraction result supplied from said subtractor and the value supplied from said second selector and outputting a sign of the sum to said second angular difference detector; and a register holding a preceding sum supplied from said adder and outputting the preceding sum to said second angular difference detector.

5. The demodulator according to claim 1, wherein said second calculation unit uses parameters corrected with an angle value $\pi/2$ defined as a predetermined value to calculate the angle value of the frequency component, and said second angular difference detector uses a predetermined number of higher bits of the subtraction result supplied from said subtractor to detect the angular difference value.

6. The demodulator according to claim 5, further comprising:

a first selector outputting, when respective signs of xy coordinate values supplied from said first calculation unit are the same, said xy coordinate values directly, and interchanging, when respective signs of xy coordinate values are different from each other, said xy coordinate values and accordingly outputting the xy coordinate values; and an absolute value determination unit calculating respective absolute values of the values supplied from said first selector and supplying the calculated absolute values to said second calculation unit.

7. The demodulator according to claim 5, further comprising:

a first adder calculating a sum of the subtraction result supplied from said subtractor and a first value and supplying a sign of the sum to said second angular difference detector; and a second adder calculating a sum of the subtraction result supplied from said subtractor and a second value different from said first value and supplying a sign of the sum to said second angular difference detector.

8. The demodulator according to claim 5, further comprising:

a second selector selecting and outputting one of a first value and a second value different from the first value;

an adder calculating a sum of the subtraction result supplied from said subtractor and the value supplied from said second selector and outputting a sign of the sum to said second angular difference detector; and a register holding a preceding sum supplied from said adder and outputting the preceding sum to said second angular difference detector.

9. A demodulation method comprising the steps of:

separating an analogue waveform into a frequency component to calculate preceding xy coordinate values, on an xy plane, of the frequency component;

calculating current xy coordinate values on the xy plane of said frequency component;

detecting an angular variation value according to respective signs of said calculated current xy coordinate values and respective signs of said calculated preceding xy coordinate values;

calculating a preceding angle value of said frequency component according to respective absolute values of said preceding xy coordinate values;

calculating a current angle value of said frequency component according to respective absolute values of said current xy coordinate values;

subtracting said calculated preceding angle value from said calculated current angle value;

classifying a result of the subtraction as one of a plurality of angle regions to detect an angular difference value; and performing demapping according to a sum of said detected angular variation value and said detected angular difference value.

10. The demodulation method according to claim 9, further comprising the steps of:

interchanging said preceding x coordinate value and said preceding y coordinate value when respective signs of said preceding x coordinate value and said preceding y coordinate value are different from each other; and interchanging said current x coordinate value and said current y coordinate value when respective signs of said current x coordinate value and said current y coordinate value are different from each other, wherein said step of calculating the preceding angle value of said frequency component includes the step of calculating the preceding angle value of said frequency component according to respective absolute values of said interchanged preceding xy coordinate values, and said step of calculating the current angle value of said frequency component includes the step of calculating the current angle value of said frequency component according to respective absolute values of said interchanged current xy coordinate values.

11. The demodulation method according to claim 9, wherein said step of classifying the result of subtraction as one of a plurality of angle regions to detect the angular difference value includes the step of detecting said angular difference value according to a sign of a sum of said result of subtraction and a first value and according to a sign of a sum of said result of subtraction and a second value different from said first value.

12. The demodulation method according to claim 9, further comprising the step of selecting one of a first value and a second value different from the first value, wherein said step of classifying the result of subtraction as one of a plurality of angle regions to detect the angular difference value includes the step of calculating a sum of said result of subtraction and said selected value to detect said angular difference value according to a sign of said sum.

13. The demodulation method according to claim 9, wherein said step of calculating the preceding angle value of said frequency component includes the step of calculating the preceding angle value of said frequency component by using parameters corrected with an angle value $\pi/2$ defined as a predetermined value, said step of calculating the current angle value of said frequency component includes the step of calculating the current angle value of said frequency component by using parameters corrected with an angle value π/2 defined as a predetermined value, and said step of classifying said result of subtraction as one of a plurality of angle regions to detect the angular difference value includes the step of detecting the angular difference value by using a predetermined number of higher bits of said result of subtraction.

14. The demodulation method according to claim 13, further comprising the steps of:

interchanging said preceding x coordinate value and said preceding y coordinate value when respective signs of said preceding x coordinate value and said preceding y coordinate value are different from each other; and interchanging said current x coordinate value and said current y coordinate value when respective signs of said current x coordinate value and said current y coordinate value are different from each other, wherein said step of calculating the preceding angle value of said frequency component includes the step of calculating the preceding angle value of said frequency component according to respective absolute values of said interchanged preceding xy coordinate values, and said step of calculating the current angle value of said frequency component includes the step of calculating the current angle value of said frequency component according to respective absolute values of said interchanged current xy coordinate values.

15. The demodulation method according to claim 13, wherein said step of classifying the result of calculation as one of a plurality of angle regions to detect the angular difference value includes the step of detecting said angular difference value according to a sign of a sum of said result of subtraction and a first value and according to a sign of a sum of said result of subtraction and a second value different from said first value.

16. The demodulation method according to claim 13, further comprising the step of selecting one of a first value and a second value different from the first value, wherein said step of classifying the result of subtraction as one of a plurality of angle regions to detect the angular difference value includes the step of calculating a sum of said result of subtraction and said selected value to detect said angular difference value according to a sign of said sum.

* * * * *